US011846821B2

(12) United States Patent
Sievers et al.

(10) Patent No.: US 11,846,821 B2
(45) Date of Patent: *Dec. 19, 2023

(54) ADAPTER BLOCK ASSEMBLY

(71) Applicant: COMMSCOPE TECHNOLOGIES LLC, Hickory, NC (US)

(72) Inventors: Scott C. Sievers, Jordan, MN (US); Loren J. Mattson, Richfield, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/188,517

(22) Filed: Mar. 1, 2021

(65) Prior Publication Data
US 2021/0255410 A1 Aug. 19, 2021

Related U.S. Application Data

(63) Continuation of application No. 16/335,593, filed as application No. PCT/US2017/052501 on Sep. 20, 2017, now Pat. No. 10,935,747.

(60) Provisional application No. 62/397,449, filed on Sep. 21, 2016.

(51) Int. Cl.
*G02B 6/44* (2006.01)
(52) U.S. Cl.
CPC .................. *G02B 6/4471* (2013.01)
(58) Field of Classification Search
CPC .................................................. G02B 6/4471
See application file for complete search history.

(56) References Cited

U.S. PATENT DOCUMENTS

| 5,688,145 | A | 11/1997 | Liu |
| 7,296,935 | B1 | 11/2007 | Childers et al. |
| 7,503,802 | B2 * | 3/2009 | Tu .......................... H01R 27/02 439/906 |
| 8,164,010 | B2 * | 4/2012 | Zhou ..................... H01R 13/70 200/51.02 |
| 8,494,329 | B2 | 7/2013 | Nhep et al. |
| 9,075,203 | B2 | 7/2015 | Holmberg |
| 9,261,651 | B2 | 2/2016 | Murphy et al. |

(Continued)

FOREIGN PATENT DOCUMENTS

| CA | 2 947 584 A1 | 6/2016 |
| CN | 203287563 U | 11/2013 |

(Continued)

OTHER PUBLICATIONS

International Search Report and Written Opinion of the International Searching Authority for International Patent Application No. PCT/US2017/052501 dated Jan. 10, 2018, 15 pages.

(Continued)

Primary Examiner — Tina M Wong
(74) Attorney, Agent, or Firm — Merchant & Gould P.C.

(57) ABSTRACT

An adapter block assembly includes two housing pieces that cooperate to hold one or more adapters therebetween. The two housing pieces are removably latched together. Labels can be placed over the latches. Certain types of adapter block assemblies are configured to receive multi-fiber plug connectors. Certain types of adapter block assemblies include securement arrangements at opposite ends thereof to aid in mounting the adapter block assemblies to frames, trays, chassis, or other such structures.

18 Claims, 15 Drawing Sheets

(56) References Cited

U.S. PATENT DOCUMENTS

| | | |
|---|---|---|
| 9,261,654 B2 | 2/2016 | Murphy et al. |
| 9,285,552 B2 | 3/2016 | Marcouiller et al. |
| 9,435,974 B2 | 9/2016 | Smrha et al. |
| 10,012,813 B2 | 7/2018 | Petersen et al. |
| 2003/0031423 A1 | 2/2003 | Zimmel |
| 2009/0232455 A1 | 9/2009 | Nhep |
| 2011/0222819 A1 | 9/2011 | Anderson et al. |
| 2012/0020634 A1 | 1/2012 | Smrha et al. |
| 2014/0219615 A1 | 8/2014 | Petersen et al. |
| 2014/0220794 A1* | 8/2014 | Taylor ............... G02B 6/3825 439/55 |
| 2016/0178859 A1 | 6/2016 | Thompson et al. |
| 2016/0187594 A1 | 6/2016 | Marcouiller et al. |
| 2017/0199338 A1* | 7/2017 | Leigh ............... G02B 6/3885 |
| 2020/0026019 A1 | 1/2020 | Sievers et al. |

FOREIGN PATENT DOCUMENTS

| | | |
|---|---|---|
| EP | 2 922 147 A1 | 9/2015 |
| WO | 2013/109469 A1 | 7/2013 |

OTHER PUBLICATIONS

Extended European Search Report for European Patent Application No. 17853806.2 dated Jan. 24, 2020, 8 pages.

* cited by examiner

ADAPTER BLOCK ASSEMBLY

CROSS-REFERENCE TO RELATED APPLICATION

This application is a continuation of U.S. patent application Ser. No. 16/335,593, filed on Mar. 21, 2019, now U.S. Pat. No. 10,935,747, which is a National Stage Application of PCT/US2017/052501, filed on Sep. 20, 2017, which claims the benefit of U.S. Patent Application Ser. No. 62/397,449, filed on Sep. 21, 2016, the disclosures of which are incorporated herein by reference in their entireties. To the extent appropriate, a claim of priority is made to each of the above disclosed applications.

BACKGROUND

As demand for telecommunications increases, fiber optic networks are being extended in more and more areas. Management of the cables, ease of installation, and ease of accessibility for later management are important concerns. As a result, there is a need for fiber optic devices and methods which address these and other concerns.

SUMMARY

Some aspects of the disclosure are directed to an adapter block assembly that is elongated along a length between a first end and a second end. The adapter block assembly has a first port side and an opposite second port side that each extends along the length between the first and second ends. The adapter block assembly includes a first housing piece and a second housing piece. The first housing piece extends along the length between the first and second ends. The first housing piece defines the first port side. The first housing piece also includes a first portion of a retention arrangement. The second housing piece extends along the length between the first and second ends. The second housing piece defines the second port side. The second housing piece also includes a second portion of a retention arrangement. The second portion is configured to mate with the first portion to hold the first and second housing pieces together. The first and second housing pieces cooperate to define an interior when the first and second housing pieces are held together.

In certain implementations, an adapter fits within the interior.

In certain implementations, the adapter is one of a plurality of adapters that fit within the interior.

In certain implementations, the adapters fit within the interior in a row.

In certain implementations, the adapter is configured to receive and align two multi-fiber connectors.

In certain implementations, the adapter is a duplex adapter configured to receive and align two pairs of multi-fiber connectors.

In certain implementations, the first portion of the retention arrangement includes a latch arm and the second portion of the retention arrangement includes a latch receptacle sized to receive the latch arm.

In certain implementations, the first portion of the retention arrangement includes a plurality of latch arms and the second portion of the retention arrangement includes a plurality of latch receptacles. Each latch receptacle is sized to receive a corresponding one of the latch arms.

In certain implementations, the first portion of the retention arrangement includes a first latch arm and a first latch receptacle and the second portion of the retention arrangement includes a second latch arm and a second latch receptacle sized to receive the first latch arm. The first latch receptacle is sized to receive the second latch arm.

In certain implementations, each portion of the retention arrangement includes a plurality of latch arms and a plurality of latch receptacles.

In certain implementations, the first housing piece is identical to the second housing piece.

In certain implementations, the first and second retention walls cooperate to define first and second non-port sides of the adapter block assembly when the second housing piece is held to the first housing piece. At least one of the non-port sides defines a recessed area at which a label can be disposed.

In certain implementations, a label attached to the first non-port side to cover at least part of the first and second portions of the retention arrangement.

In certain implementations, a first securement arrangement disposed at the first end of the adapter block assembly and a second securement arrangement disposed at the second end of the adapter block assembly.

In certain implementations, each of the securement arrangements includes a first part disposed at the first housing piece and a second part disposed at the second housing pieces. The first part cooperates with the second part to form the respective securement arrangement when the first housing piece is held to the second housing piece.

In certain implementations, the first securement arrangement is fully formed by the first housing piece and the second securement arrangement is fully formed by the second housing piece.

In certain implementations, each securement arrangement includes a latching hook.

Other aspects of the disclosure are directed to a fixture for use in assembling an adapter block assembly. The fixture includes a body including a base that is elongated along a length between a first end and a second end; and alignment members disposed in a row along the base and extending upwardly from the base. Each alignment member is sized to fit within a port of an adapter.

In certain implementations, a first alignment guide extends upwardly from the base at the first end. In certain examples, a second alignment guide extends upwardly from the base at the second end.

In certain implementations, each alignment member includes a key member sized and is shaped to fit within a keyway defined by a respective port of an adapter.

In certain implementations, an adapter block assembly is mounted to the fixture.

In certain implementations, a first housing piece is mounted to the fixture.

In certain implementations, an adapter is mounted over the first housing piece so that one of the alignment members extends into a port defined by the adapter.

In certain implementations, sides of the fixture that extend between the first and second ends are sufficiently low to the base to enable labels to be added to the adapter block assembly without removing the adapter block assembly from the fixture.

In certain implementations, the fixture includes indicia that indicate a rotational orientation of the adapter block assembly.

Other aspects of the disclosure are directed to a method of assembling of adapter block assembly. The method includes mounting a first housing piece onto a fixture. The first housing piece has a first port side facing a base of the fixture.

The fixture includes an alignment member that extends upwardly through an aperture defined in the first port side of the first housing piece.

In certain implementations, the method also includes mounting an adapter to the fixture over the first housing piece. The adapter defines a port. The adapter is mounted so that the alignment member of the fixture extends into the port.

In certain implementations, the method also includes mounting a second housing piece over the adapter so that the adapter is disposed within a cavity defined by the first and second housing pieces; and securing the second housing piece to the first housing piece to form an adapter block assembly.

In certain implementations, the alignment member includes a key that fits with a keyway defined at the port to rotationally orient the adapter relative to the fixture.

In certain implementations, the method also includes applying a label to a first non-port side of the adapter block assembly without removing the adapter block assembly from the fixture.

In certain implementations, the method also includes rotating the fixture and the adapter block assembly to lay an opposite second non-port side on a surface prior to applying the label to the first non-port side. The fixture is rotated based on indicia identifying the first non-port side.

In certain implementations, the method also includes rotating the fixture and the adapter block assembly to lay the first non-port side on the surface; and applying a second label to the second non-port side.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure is directed to an adapter block assembly having a first port side and an opposite second port side. Each port side defines one or more ports that align with the one or more ports on the opposite side. The adapter block assembly includes first and second securement arrangements at opposite ends to facilitate mounting the adapter block assembly to a frame, tray, drawer, rack, chassis, or other such structure. The adapter block assembly is assembled so as to be handled as a unit. Any plug connectors received at the ports are carried with the adapter block assembly.

Figure 1:
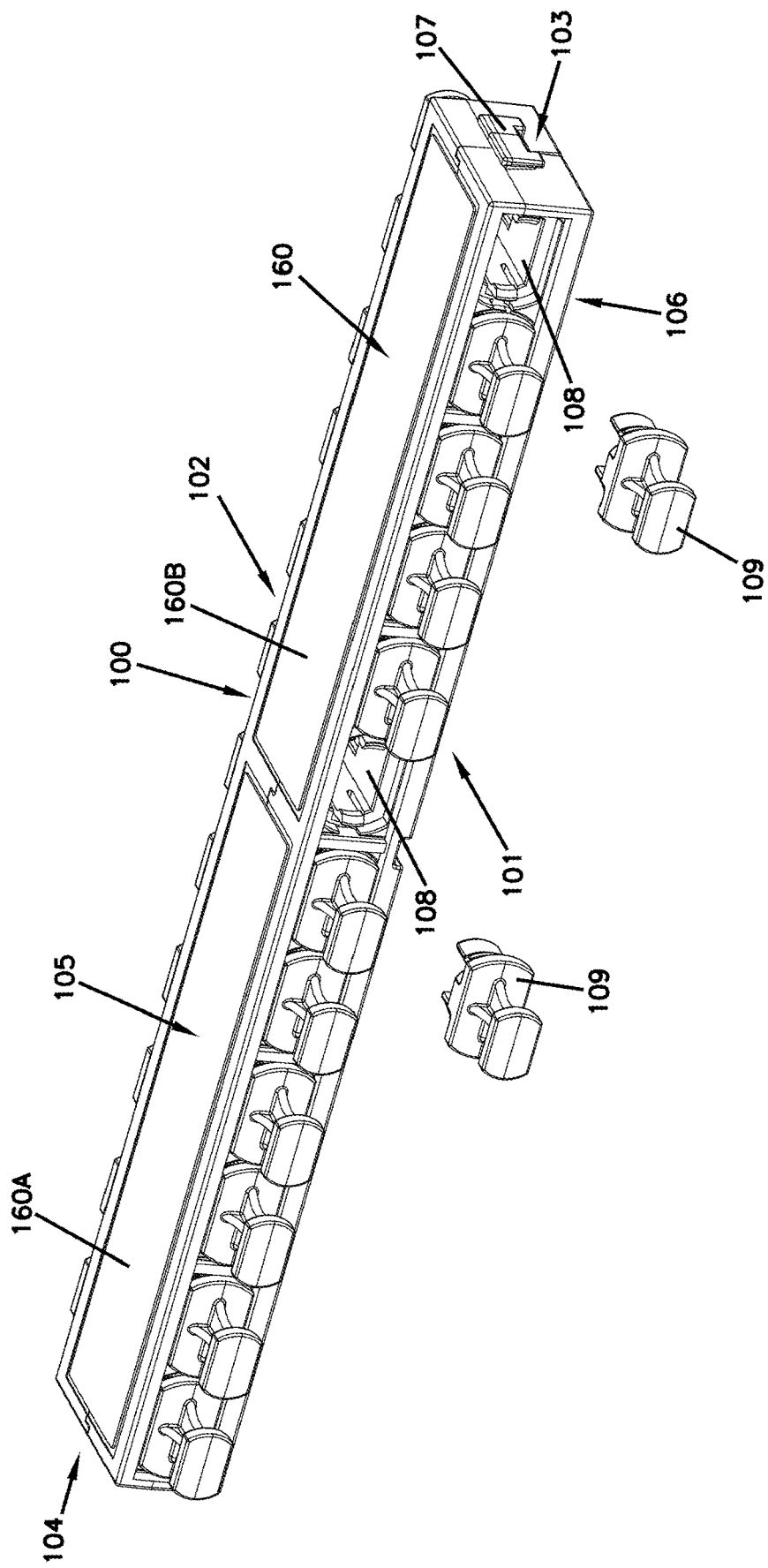
FIG. 1 is a first port side perspective view of an example adapter block assembly configured in accordance with the principles of the present disclosure.
Figure 2:
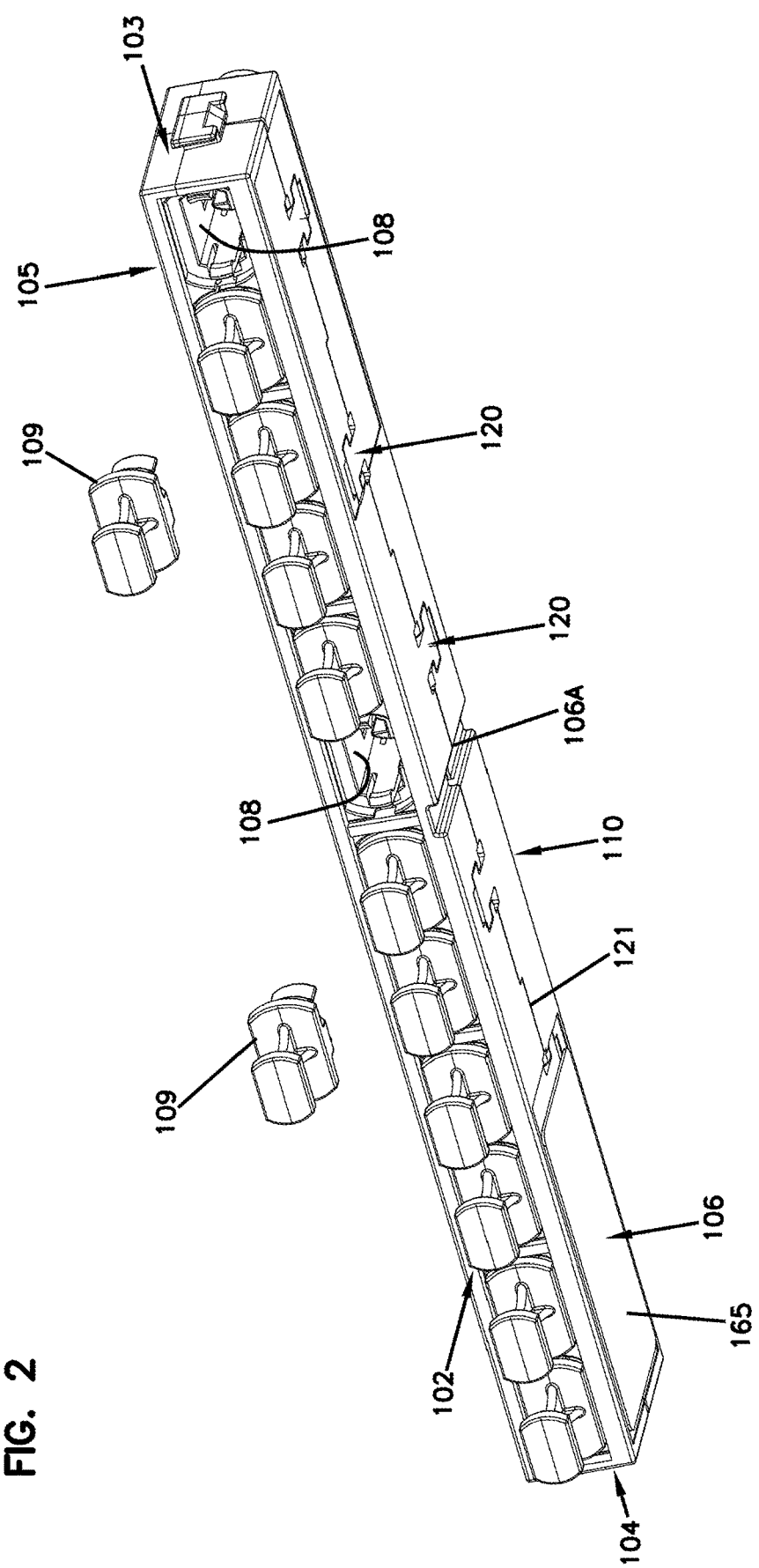
FIG. 2 is a second port side perspective view of the example adapter block assembly of FIG. 1.

FIGS. 1 and 2 illustrate an example adapter block assembly 100 structured and configured in accordance with the principles of the present disclosure. The adapter block assembly 100 is elongated along a length between a first end 103 and a second end 104. The adapter block assembly 100 has a first port side 101 and an opposite second port side 102 that each extend along the length between the first and second ends 103, 104. One or more connection ports 108 are defined at each port side 101, 102. The ports 108 align optical plug connectors received at the opposite port sides 101, 102. Each port 108 can receive a dust cap 109 when not in use (i.e., when a plug connector is not received at the port 108).

Opposite non-port sides 105, 106 extend between the port sides 101, 102 and between the first and second ends 103, 104. In certain examples, the non-port sides 105, 106 have more surface area than the port sides 101, 102. In certain examples, labels or other indicia can be provided at one or both of the non-port sides 105, 106. In certain examples, portions of the non-port sides 105, 106 are recessed (see 115) to accommodate the labels without increasing a footprint of the adapter block assembly 100.

In certain examples, indicia can be provided on the first non-port side 105 in alignment with the ports 108 to provide port identification. In the example shown in FIG. 1, a first adhesive port label 160A is disposed on the first non-port side 105 across a first set of ports 108 and a second adhesive port label 160B is disposed on the first non-port side 105 across a second set of ports 108. In other examples, however, the port labels 160 can be held by a transparent cover, molded into, silk screened onto, or otherwise disposed at the non-port side 105. As shown in FIG. 2, a block label 165 can be disposed elsewhere on the adapter block assembly 100, such as on the second non-port side 106. The block label 165 can provide identification for the adapter block 100. As with the first label 160, the block label 165 can be held by adhesive, a transparent cover, or can be silk screened or molded onto the adapter block 100.

In certain implementations, a securement arrangement 107 can be disposed at the first end 103. The securement arrangement 107 is configured to engage mounting structure on a tray, drawer, frame, chassis, blade, or other retention structure to hold the adapter block assembly 100 at the retention structure. In certain examples, the securement arrangement 107 is a first securement arrangement and a second securement arrangement 107 can be provided at the second end 104. In the example shown, the first securement arrangement 107 is identical to the second securement arrangement 107. In certain examples, each securement arrangement 107 includes a hook. In certain examples, each securement arrangement 107 includes a latching shoulder. In certain examples, each securement arrangement 107 includes rails extending outwardly from opposite sides of a ramp.

In certain examples, the adapter block assembly 100 defines recesses, channels, or other such features that provide clearance and/or alignment with the retention structure to which the adapter block assembly 100 is to be mounted. For example, the second non-port surface 106 defines a channel 106A that extends across the second non-port side 106 between the two port sides 101, 102. In certain examples, the channel 106A accommodates a raised portion of the retention structure. In an example, the channel 106A aligns with the raised portion to properly position the adapter block assembly 100 at the retention structure.

Figure 3:
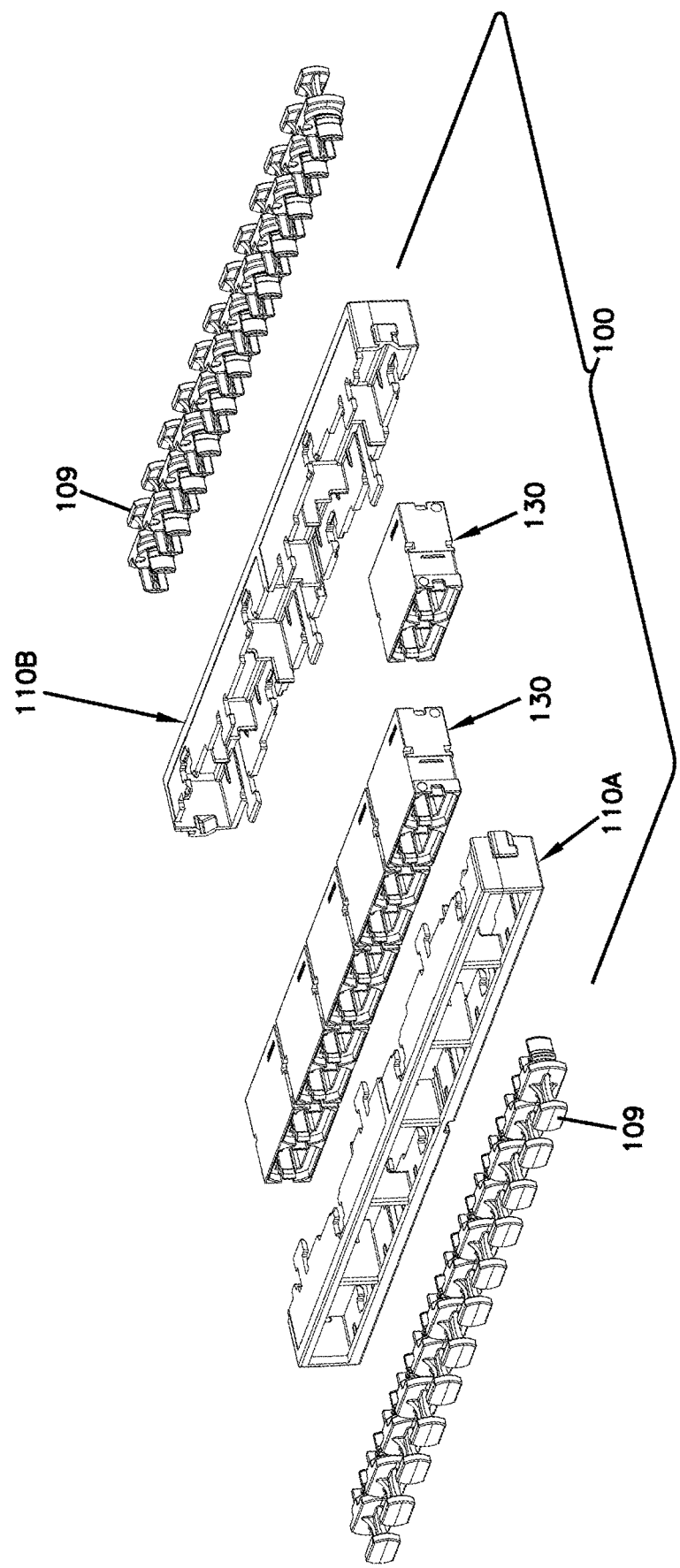
FIG. 3 is a perspective view of the adapter block assembly of FIG. 1 with the components exploded from each other.

Referring to FIG. 3, the adapter block assembly 100 includes a first housing piece 110A that mates with a second housing piece 110B. Each housing piece 110A, 110B defines one of the port sides 101, 102. In certain examples, one or more adapters 130 are disposed between the first and second housing pieces 110A, 110B. Each adapter 130 includes the alignment structures that hold the plug connectors at the ports 108. In some examples, the first housing piece 110A is identical to the second housing piece 110B. In other examples, however, the first and second housing pieces 110A, 110B can be distinct from each other.

Figure 4:
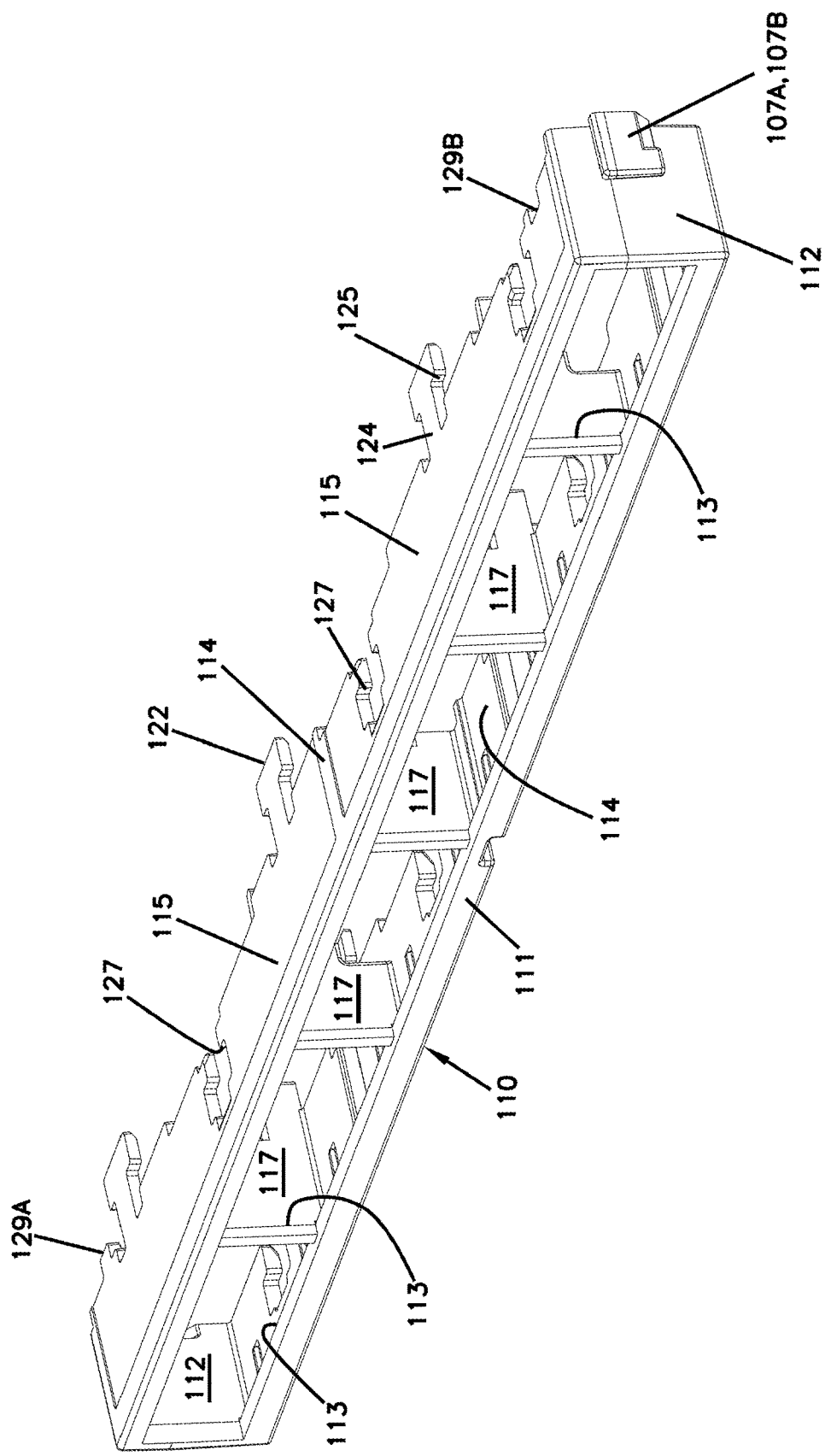
FIGS. 4 and 5 are perspective views of an example housing piece suitable for use with the adapter block assembly of FIG. 1.
Figure 5:
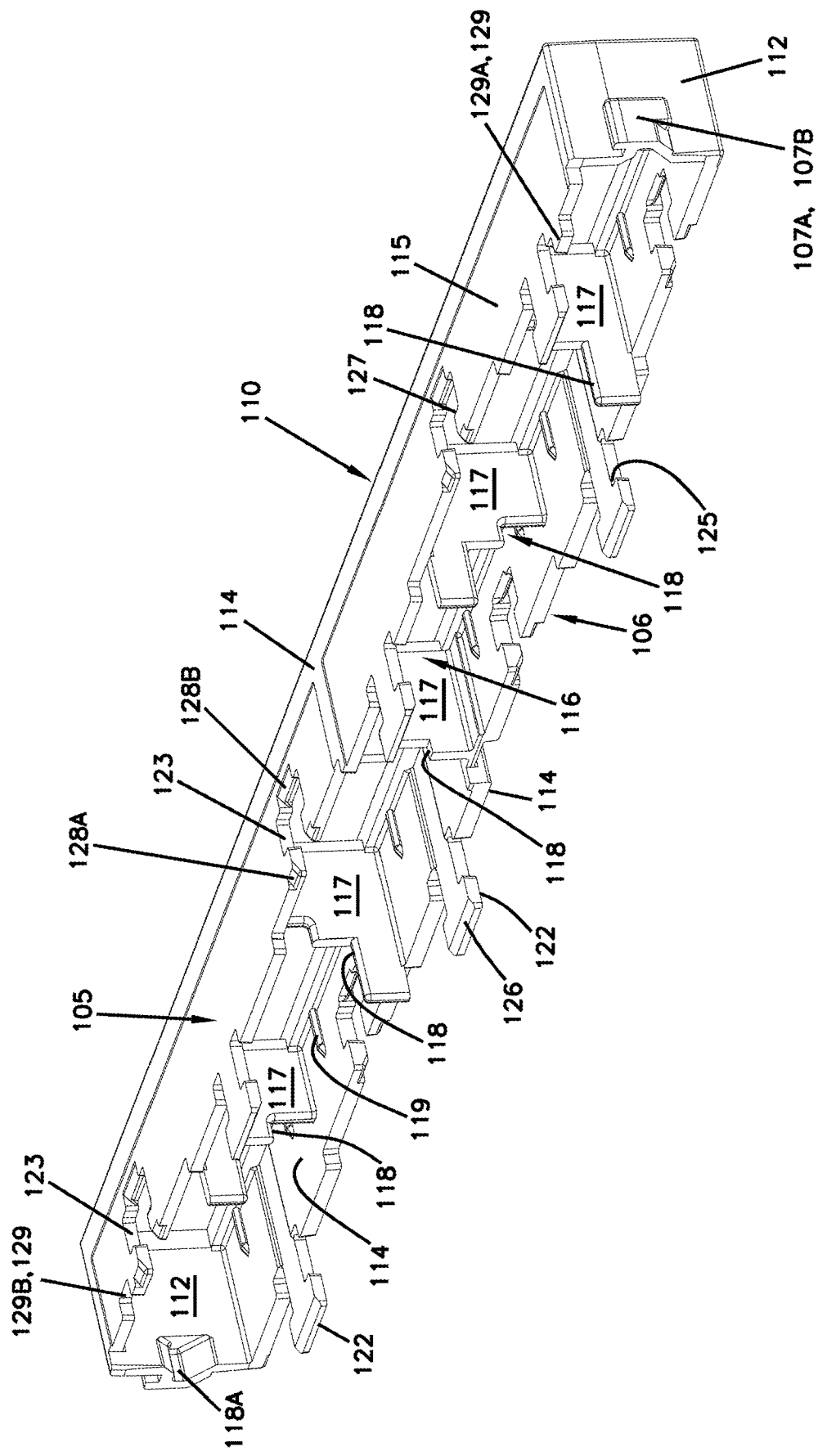

FIGS. 4 and 5 illustrate an example housing piece 110 that is suitable for use as the first housing piece 110A and/or the second housing piece 110B. The housing piece 110 extends along the length of the adapter block 100 between the first and second sides 103, 104. The housing piece 110 includes a first surface 111 that defines one of the port sides 101, 102. The first surface 111 extends between opposite ends 112 of the housing piece 110. The ends 112 of two housing pieces 110 cooperate to form one of the adapter block assembly ends 103, 104 (see FIG. 1). One or more apertures 113 are defined in the first surface 111 to provide access to the ports. In some examples, each aperture 113 provides access to one port 108. In other examples, however, each aperture 113 can provide access to multiple ports 108. In other examples, the first surface 111 defines a single aperture 113 that provides access to all ports 108 at the respective port side 101, 102.

The housing piece 110 includes retention walls 114 that extend between the first and second ends 112 and away from the first surface 111. The retention walls 114 extend from opposite sides of the first surface 111 so that the retention walls 114 cooperate with the ends 112 and the first surface 111 to define an interior cavity 116. When the first and second housing pieces 110A, 110B are held together, the respective interior cavities 116 cooperate to define an interior in which one or more adapters 130 can be disposed as will be discussed in more detail herein.

A retention arrangement 120 (FIG. 2) holds together the first and second housing pieces 110. In certain examples, the retention arrangement 120 is disposed along the seam 121 (FIG. 2) between the two housing pieces 110A, 110B. In certain implementations, the retention arrangement 120 includes a first portion that is disposed at the first housing piece 110A and a second portion that is disposed at the second housing piece 110B. In certain examples, the retention arrangement 120 includes multiple retaining features that are disposed at each housing piece 110. The retaining features mate together to hold the housing pieces 110A, 110B together.

In some implementations, the first portion of the retention arrangement 120 includes a latch arm 122 and the second portion of the retention arrangement 120 defines a recess 123 in which the latch arm 122 is received. In other implementations, the first portion of the retention arrangement 120 includes a recess 123 and the second portion of the retention arrangement 120 defines a latch arm 122 sized to be received in the recess 123. In still other implementations, each portion of the retention arrangement 120 includes both a latch arm 122 and a recess 123. The recess 123 of each portion of the retention arrangement 120 is sized and shaped to receive the latch arm 122 of the other portion. In certain examples, each portion of the retention arrangement 120 includes multiple latch arms 122 and multiple recesses 123.

Figure 7:
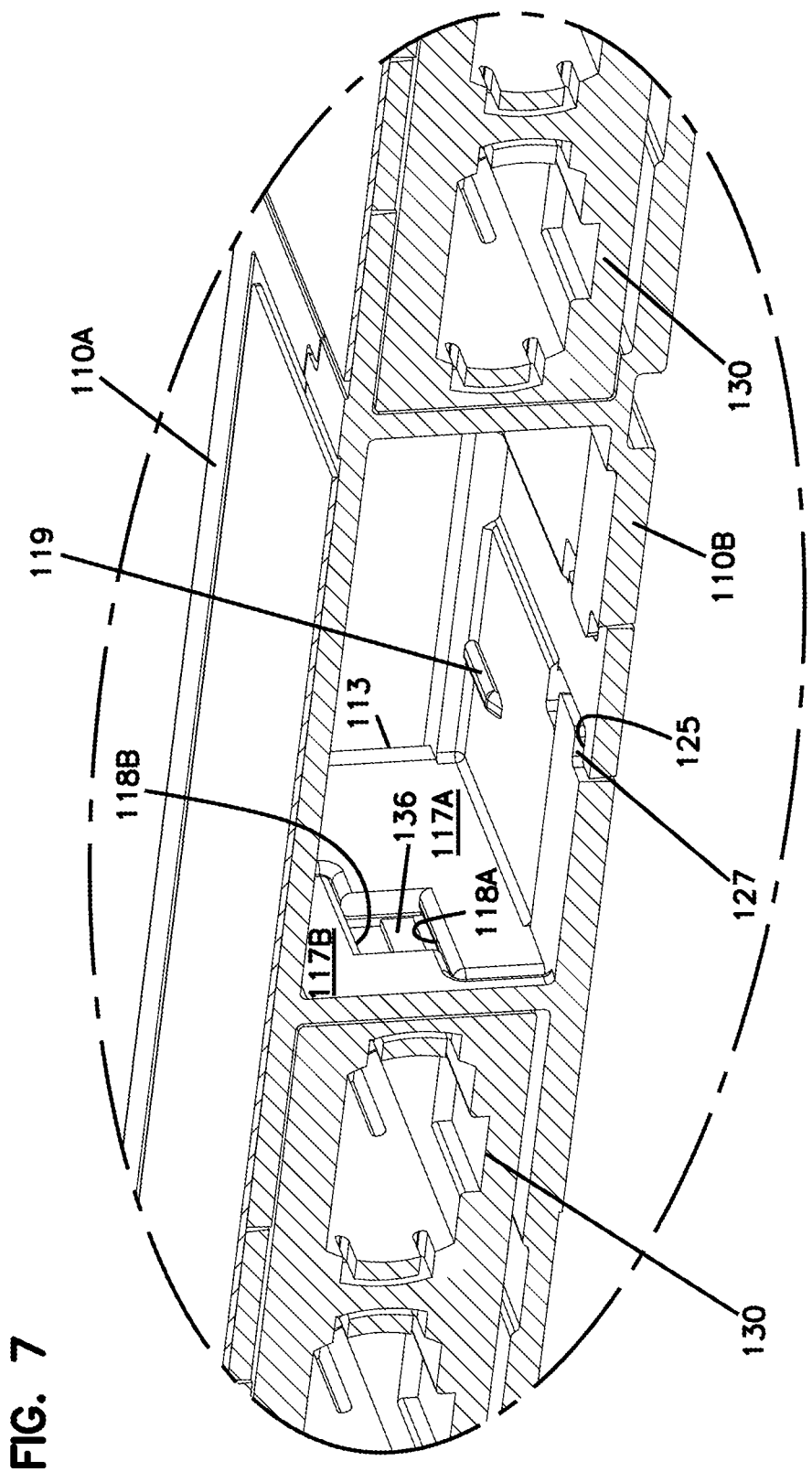
FIG. 7 is a cross-sectional view of the adapter block assembly of FIG. 1 with one of the adapters removed for ease in viewing interior features of the housing pieces.

In certain examples, each latch arm 122 includes engagement shoulders 125 disposed at a distal end of a flexible beam 124 so that the engagement shoulders 125 are cantilevered off the retention wall 114. In an example, a distal end of the latch arm 122 defines a ramp 126. In certain examples, each recess 123 defines engagement shoulders 127 that align with and abut engagement shoulders 125 of the latch arm 122 when the latch arm 122 is received at the recess 123 (see FIG. 7). In certain examples, one or more ramped surfaces 128A lead to each recess 123 so that the ramp 126 of the latch arm 122 cams over the ramped surface 128A until the engagement shoulders 125 of the latch arm 122 snap into the recess behind the engagement shoulders 127 of the recess 123.

In an example, another ramped surface 128B may be provided at the opposite end of the recess 123 from the ramped surface(s) 128A. The ramped surface 128B accommodates the ramp 126 of the latch arm 122. In certain examples, the ramped surface 128B facilitates separation of the first and second portions of the retention arrangement 120. For example, a tool can be wedge between the ramp 126 and the ramped surface 128B to pry the latch arm 122 out of the recess 123.

In certain implementations, the housing pieces 110A, 110B only fit together in a specific rotational orientation of each housing piece 110A, 110B. Accordingly, each housing piece 110 may include alignment structures 129 that are disposed on one non-port side 105, 106 and not on the other non-port side 106, 105. In the example shown in FIG. 5, one end of the first non-port side 105 of the housing piece 110 includes a protrusion 129A and the opposite end of the first non-port side 105 defines a notch 129B sized to receive the protrusion 129A. The second non-port side 106 does not include either the protrusion 129A or the notch 129B. In certain examples, the protrusion 129A fits in the notch 129B without forming an attachment thereto (in contrast to latch arms 122 and recesses 123).

In the example shown, each housing piece 110 includes part 107A, 107B of the securement arrangement 107 at each end 112. The securement arrangement parts 107A, 107B of adjoining ends 112 cooperate to define a single securement arrangement 107 when two housing pieces 110A, 110B are joined together. In other examples, however, each housing piece 110 can include a full securement part 107 at one end 112 and no securement part at the other end 112. In still other examples, one of the housing pieces 110A, 110B can include both securement arrangements 107 and the other housing piece 110A, 110B can be devoid of securement arrangements 107 or parts thereof.

Each housing piece 110 includes structure that retains the adapter(s) 130 within the interior formed by the combined cavities 116 of the housing pieces 110. In certain examples, each adapter block assembly 100 holds multiple adapters 130. In some such implementations, each housing piece 110 includes dividing walls 117 that separate the adapters 130. In certain examples, each dividing wall can include features that aid in retaining the adapter 130 at a specific location within the housing piece 110 as will be discussed in more detail herein.

Figure 6:
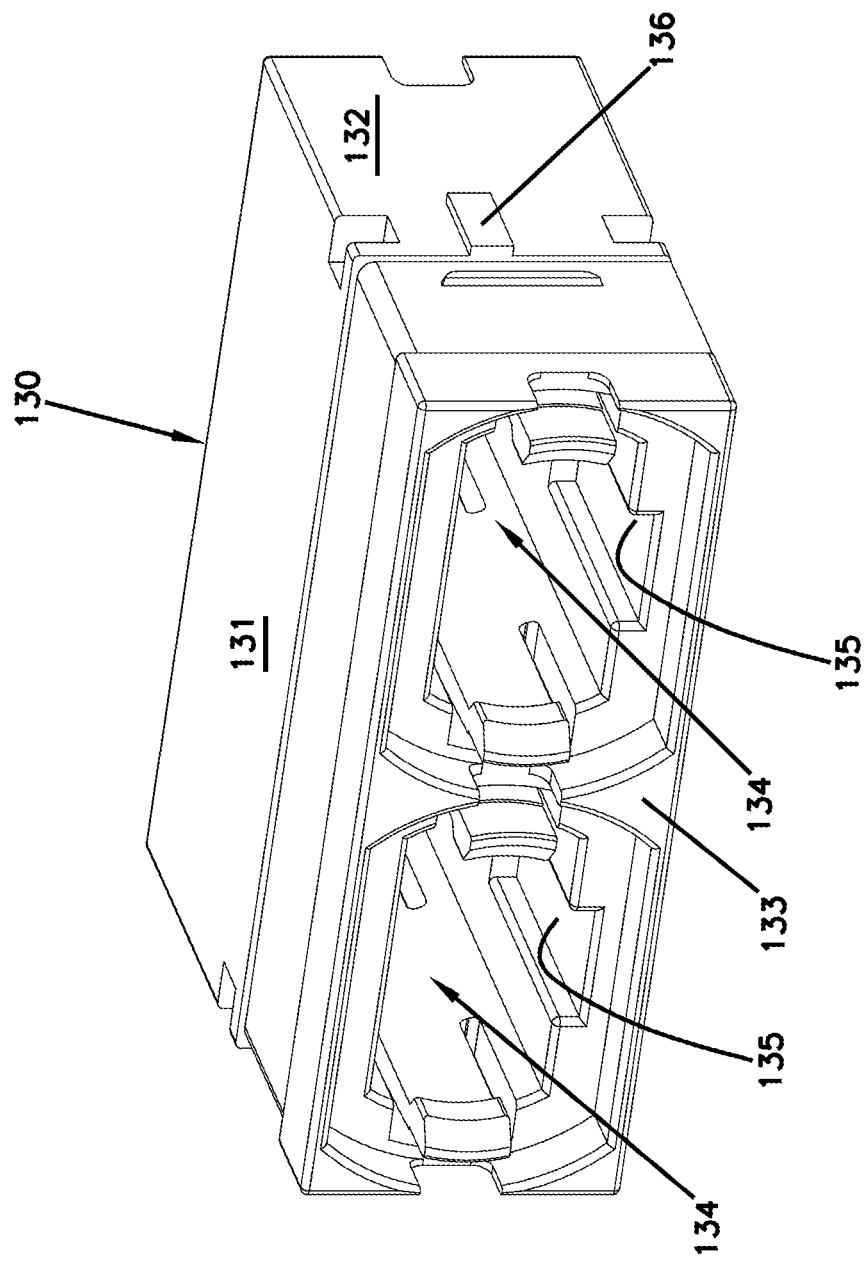
FIG. 6 is a perspective view of an example adapter suitable for use with the adapter block assembly of FIG. 1.

FIG. 6 illustrates an example adapter 130 suitable for use in the adapter block assembly 100. In the example shown, the adapter 130 is a multi-fiber adapter that is configured to receive a multi-fiber plug connector (e.g., an MPO connector) at each port 134. In other examples, however, the adapter 130 can be configured to receive any desired type of plug connector (e.g., a single fiber connector, an electrical connector, etc.) at each port 134.

The adapter 130 includes opposing major surfaces 131 extending between opposite end surfaces 132. Opposite port surfaces 133 extend between the opposite major surfaces 131 and between the opposite end surfaces 132. Each port surface 133 defines one or more adapter ports 134 leading to alignment structure for a plug connector received at the port 134. In certain examples, each adapter port 134 defines a keyway 135 configured to align with a key disposed on the plug connector to indicate a proper rotational orientation of the plug connector at the port 134. In various examples, the keyway orientation can be configured as either Method A (i.e., key-up/key-down) or Method B (key-up/key-up). In certain examples, retention structure (e.g., latch arms, inward-facing shoulders, bayonet lugs, etc.) for engaging the plug connector is disposed at each port 134.

In some implementations, each adapter 130 is configured to receive a single plug connector at each port side 133. In other examples, however, each adapter 130 is configured to receive multiple plug connectors at each port side 133. In the example shown, each adapter 130 is configured to receive two plug connectors at each port side 133. In certain examples, the adapter 130 is elongated along a length between the opposite ends 132 and the ports 134 of one port side 133 are disposed in a row along the elongated length.

In the example shown, the adapter 130 defines a recessed band 137 extending circumferentially or partially circumferentially around the major side(s) 131 and ends 132 of the adapter 130. In certain examples, a rib 138 can be disposed in the recessed band 137.

In certain examples, each adapter 130 fits within the interior of the adapter block assembly 100 so that the ports 134 of the adapter 130 align with the port holes 113 defined in the first side 111 of each housing piece 110. In some examples, multiple adapters 130 are disposed within the adapter block assembly interior in a row. In certain examples, dividing walls separate the adapters 130 from each other. In certain examples, each adapter 130 includes a first engagement feature that interacts with a second engagement feature of the dividing wall 117.

In the example shown in FIG. 6, the adapter 130 includes a protrusion 136 that functions as an engagement feature of the adapter 130. In other examples, however, the engagement feature could be a recess, a latch, a ramp, etc. In the example housing piece 110 shown in FIGS. 4 and 5, each housing piece 110 includes a dividing wall section 117 that is shaped to cooperate with a dividing wall section 117 of the other housing piece 110 to form the dividing wall 117. In certain examples, each dividing wall section 117 defines a notch 118 that cooperates with a notch 118 of the corresponding dividing wall section 117 of the other housing piece 110 to provide an aperture in which the protrusion 136 is captured (see FIG. 7). Accordingly, the notched dividing wall sections 117 cooperate to hold the adapter 130 is a particular position within the housing pieces 110.

In certain implementations, each housing piece 110 also can include positioning structures (e.g., ribs 119) that aid in properly positioning the adapter 130 within the housing piece 110. In certain examples, the ribs 119 hold the adapter 130 away from the retention wall 114 enough to enable sufficient flexing of the retention wall 114 relative to the adapter to secure the two portions of the retention arrangement 120 together.

Referring to FIGS. 8-15, a fixture 140 can be provided to aid in assembling the adapter block assembly 100. The fixture 140 holds the components in place during assembly. The fixture 140 also aids in rotationally aligning the components.

Figure 8:
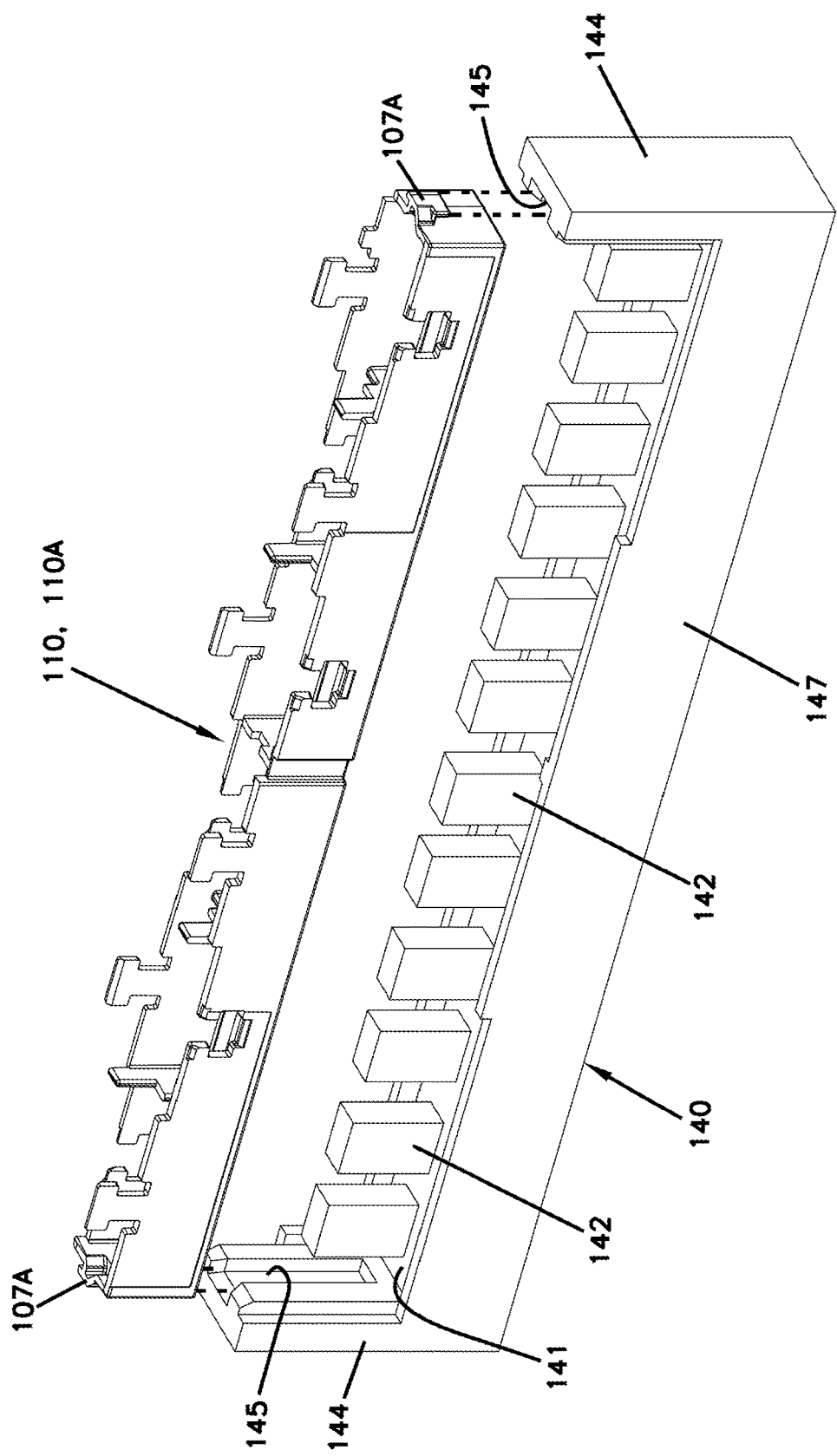
FIGS. 8-15 illustrate steps of assembling the adapter block assembly using a fixture.
Figure 9:
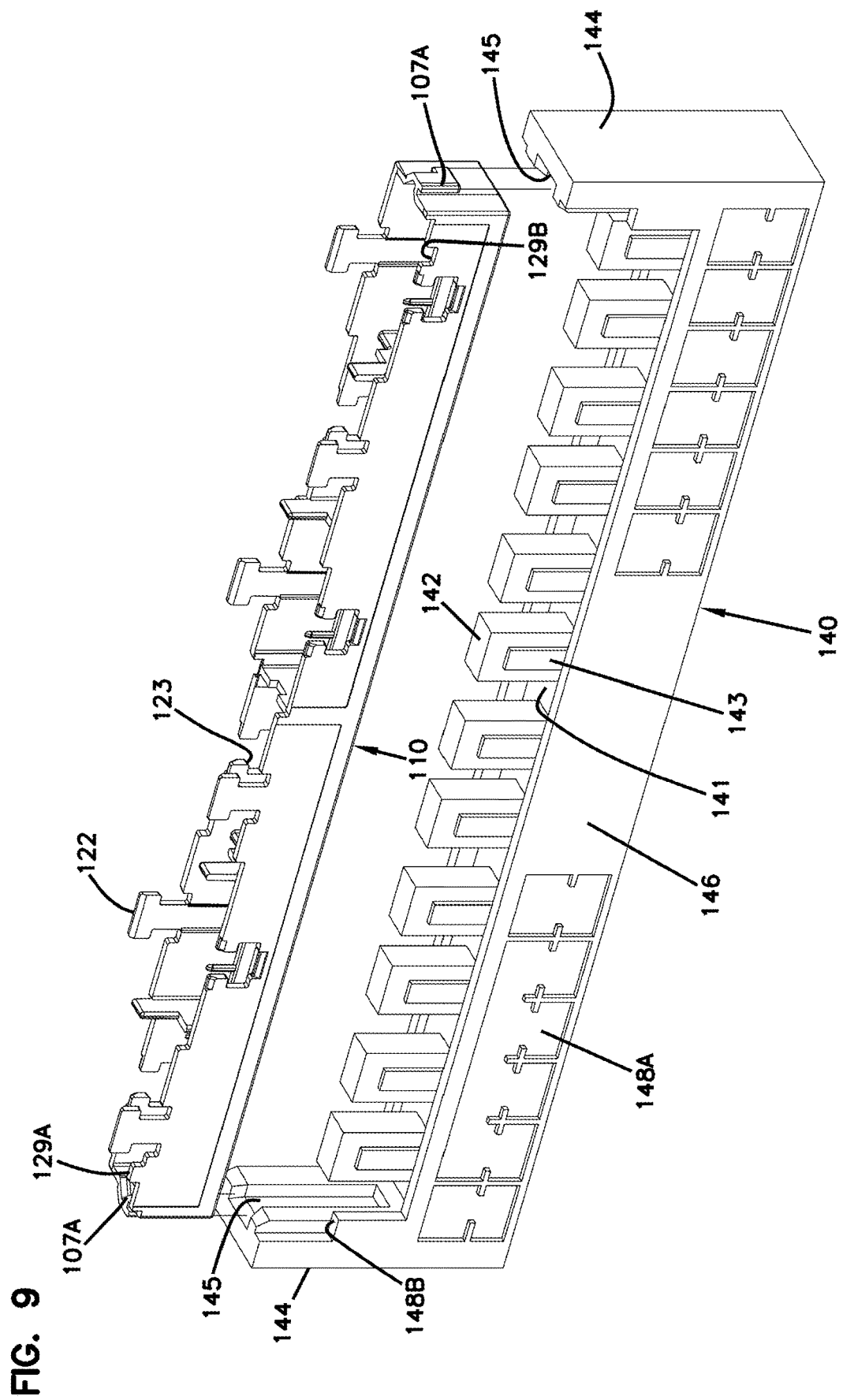

An example fixture 140 suitable for use in assembling the adapter block assembly 100 disclosed herein is shown in FIGS. 8 and 9. The fixture 140 includes a base 141 elongated along a length between a first end and a second end. One or more alignment members 142 are disposed in a row along the base 141. Each alignment member 142 extends upwardly from the base 141. Each alignment member 142 is sized to fit within a port 134 of an adapter 130. In certain examples, each alignment member 142 includes a key 143 that is sized and shaped to fit within the keyway 135 defined at the adapter port 134.

A first alignment guide 144 extends upwardly from the base 141 at the first end and a second alignment guide 144 extends upwardly from the base 141 at the second end. Each alignment guide 144 defines a channel or other guide 145 sized and shaped to accommodate a securement arrangement 107 of the adapter block assembly 100. Each guide channel 145 is open at a top of each alignment guide 144.

First and second sides 146, 147 of the fixture 141 extend along the base 141 between the first and second ends. The keys 143 of the alignment members 142 extend towards the first side 146. The opposite side of the alignment members 142 from the keys 143 faces the second side 147. In certain examples, indicia 148A are provided at the first side 146 and not at the second side 147 to distinguish between the first and second sides 146, 147. In certain examples, a flange 148B or notch can be provided at the first side 146 and not at the second side 147 to distinguish between the first and second sides 146, 147.

As shown in FIGS. 8 and 9, a user begins to assemble the adapter block 100 by inserting a first housing piece 110, 110A onto the fixture 140. The housing piece 110, 110A is oriented so that the first surface 111 is facing towards the base 141 of the fixture 140. A first portion of the retention arrangement faces away from the fixture 140. During insertion, the securement arrangement parts 107A at opposite ends of the housing piece 110A ride along the guide channels 145 defined in the first and second alignment guides 144 of the fixture 140. The alignment members 142 of the fixture 140 pass through openings 113 defined by the first surface 111 of the housing piece 110, 110A. In certain examples, the housing piece 110, 110A is inserted until the housing piece 110, 110A bottoms out on the base 141.

In certain examples, the user can use the alignment structures 129 to properly rotationally orient the housing piece 110, 110A relative to the fixture 140. In certain examples, the housing piece 110 can be rotationally oriented relative to the fixture 140 so that the alignment structures 129A, 129B of the housing 110 face the alignment flange 148B of the fixture 140. In certain examples, the housing piece 110 can be rotationally oriented relative to the fixture 140 so that the alignment structures 129A, 129B of the housing 110 face the indicia 146A of the fixture 140.

Figure 10:
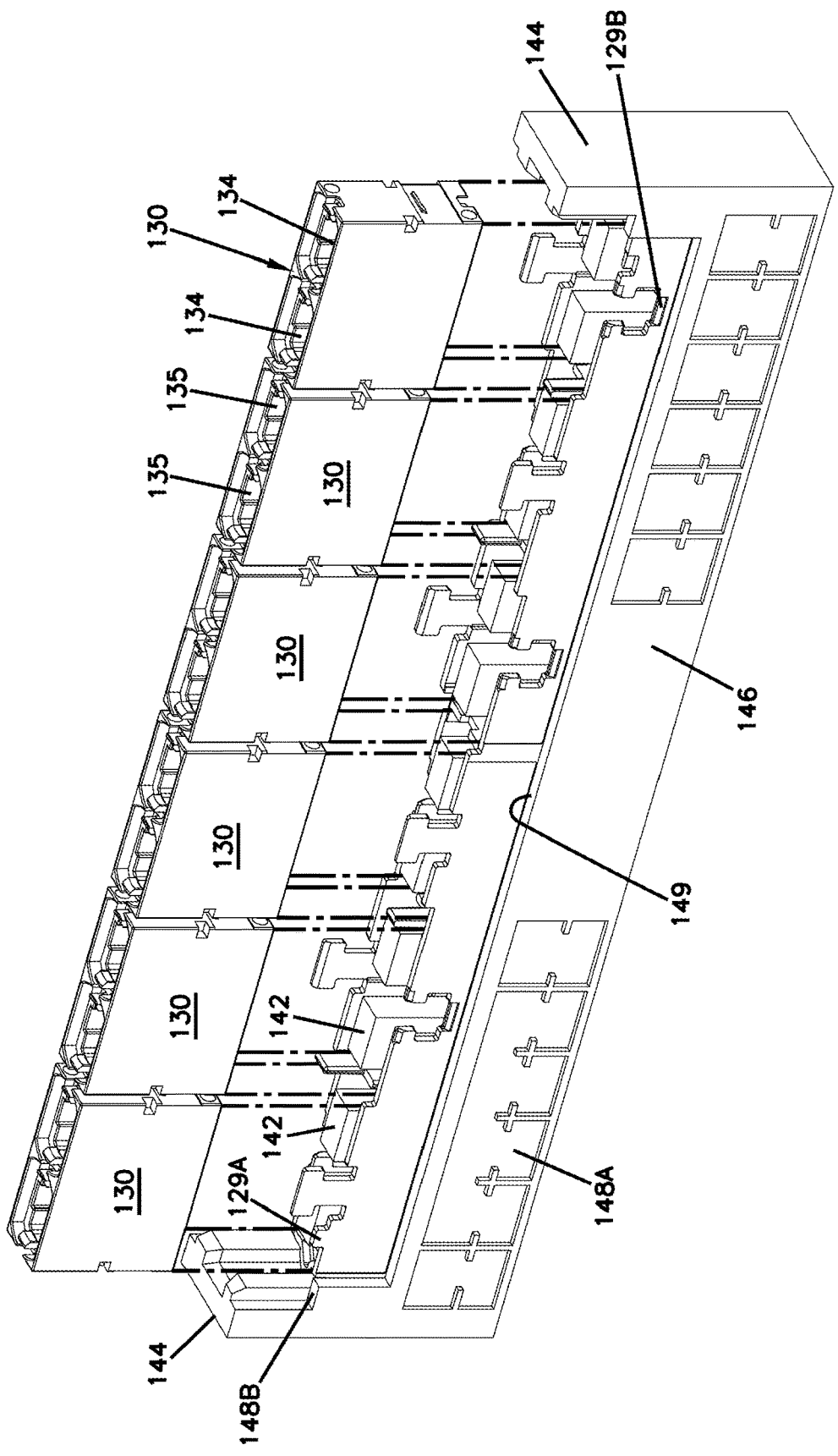

As shown in FIG. 10, one or more adapters 130 are inserted into the cavities defined by the first housing piece 110, 110A. As the adapters 130 are slid onto the fixture 140, the alignment members 142 of the fixture 140 slide into the ports 134 at one port side 133 of the adapter 130. The keys 143 of the alignment members 142 slide along the keyways 135 of the ports 134. Accordingly, the keys 143 of the alignment members 142 inhibit insertion of an adapter 130 that is not properly rotationally oriented to align the keys 143 and the keyways 135.

The keys 143 of the fixture 140 ensure that the ports 134 of the adapters 130 are rotationally oriented in a predetermined manner relative to the adapter block assembly 100. In some examples, the fixture 140 includes keys 143 that all face the first side 146 of the fixture 140. Such a fixture 140 ensures the formation of an adapter block assembly 100 having all ports 108 with a common rotational orientation (i.e., all plug connectors received at the ports 108 will have a common rotational orientation). In other examples, however, the keys 143 can be arranged on the alignment members 142 to rotationally orient each adapter 130 in any desired position. For example, the keys 143 can be disposed at alternating sides of the fixture 140 to provide ports having alternating rotational alignment (i.e., a row of ports 134 having keyways 135 on alternate sides along the row).

In certain examples, the indicia 148A and/or flange 148B may aid a user in properly orienting the adapter 130 relative to the fixture 140 and first housing piece 110, 110A. In the example shown, the user can align the adapter 130 so that the keyway 135 faces away from the indicia 148A and flange 148B.

In some examples, the adapters 130 are inserted until the protrusions 136 abut the notches 118 of the dividing wall sections 117. In other examples, the adapters 130 are inserted until one of the port sides 133 bottoms out against the first side 111 of the housing piece 110, 110A.

Figure 11:
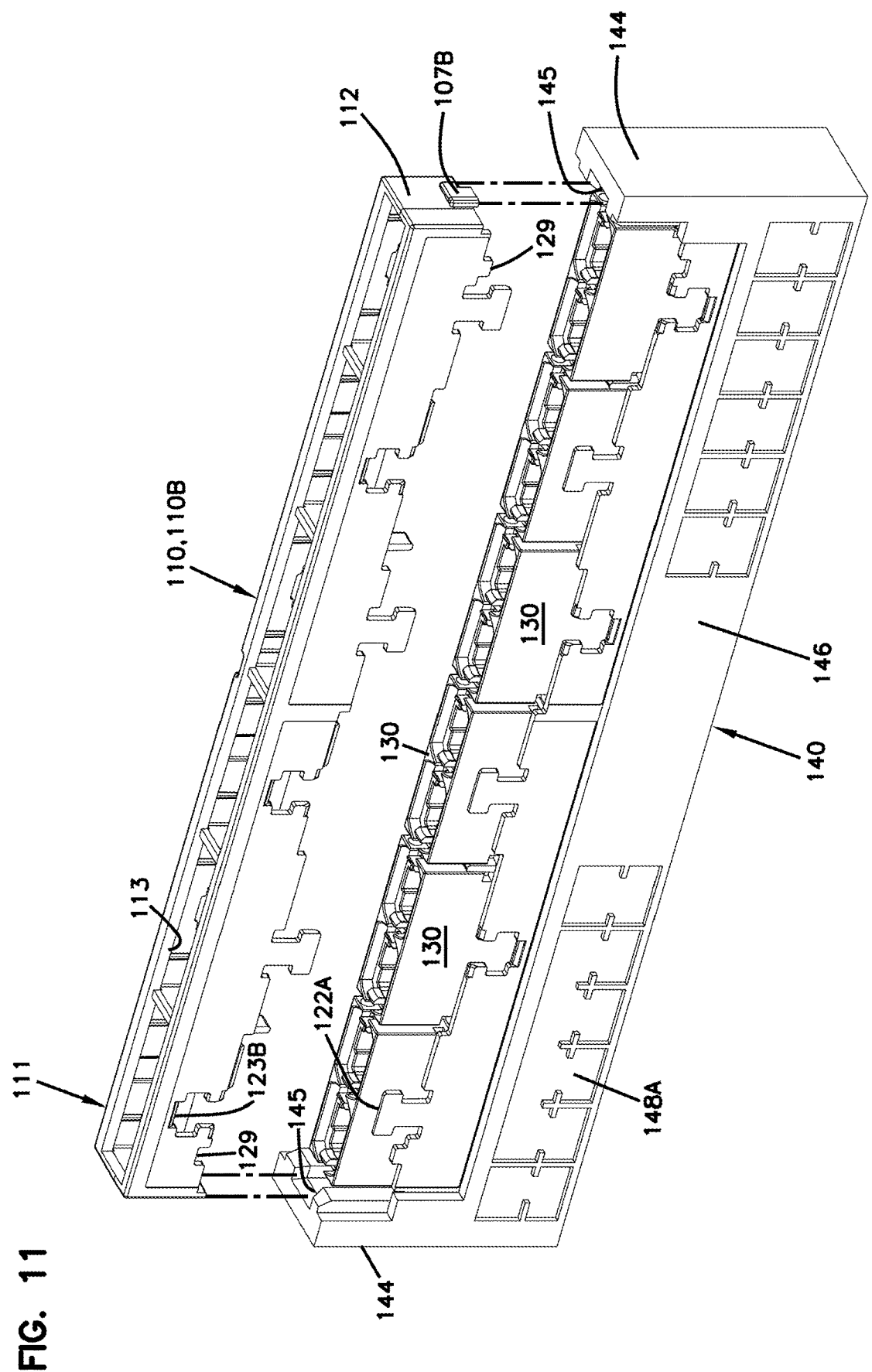

As shown in FIG. 11, a second housing piece 110, 110B is mounted to the fixture 140 over the adapters 130 so that the adapters 130 are sandwiched between the first and second housing pieces 110A, 110B. The housing piece 110, 110B is oriented so that the first surface 111 is facing away from the base 141 of the fixture 140. The second portion of the retention arrangement 120 faces the fixture 140. During insertion, the securement arrangement parts 107B at opposite ends of the housing piece 110B ride along the guide channels 145 defined in the first and second alignment guides 144 of the fixture 140.

As the second housing piece 110, 110B is mounted onto the fixture 140, the second portion of the retention arrangement 120 moves towards and then mates with the first portion of the retention arrangement 120. In certain examples, latch arms 122 of each portion cam over corresponding ramped surfaces 128A and then snap into corresponding recesses 123 (see FIG. 12). In certain examples, the protrusion 129A of the second housing piece 110, 110B fits into the notch 129B of the first housing piece 110, 110A. The protrusion 129A of the first housing piece 110, 110A fits into the notch 129B of the second housing piece 110, 110B.

Figure 12:
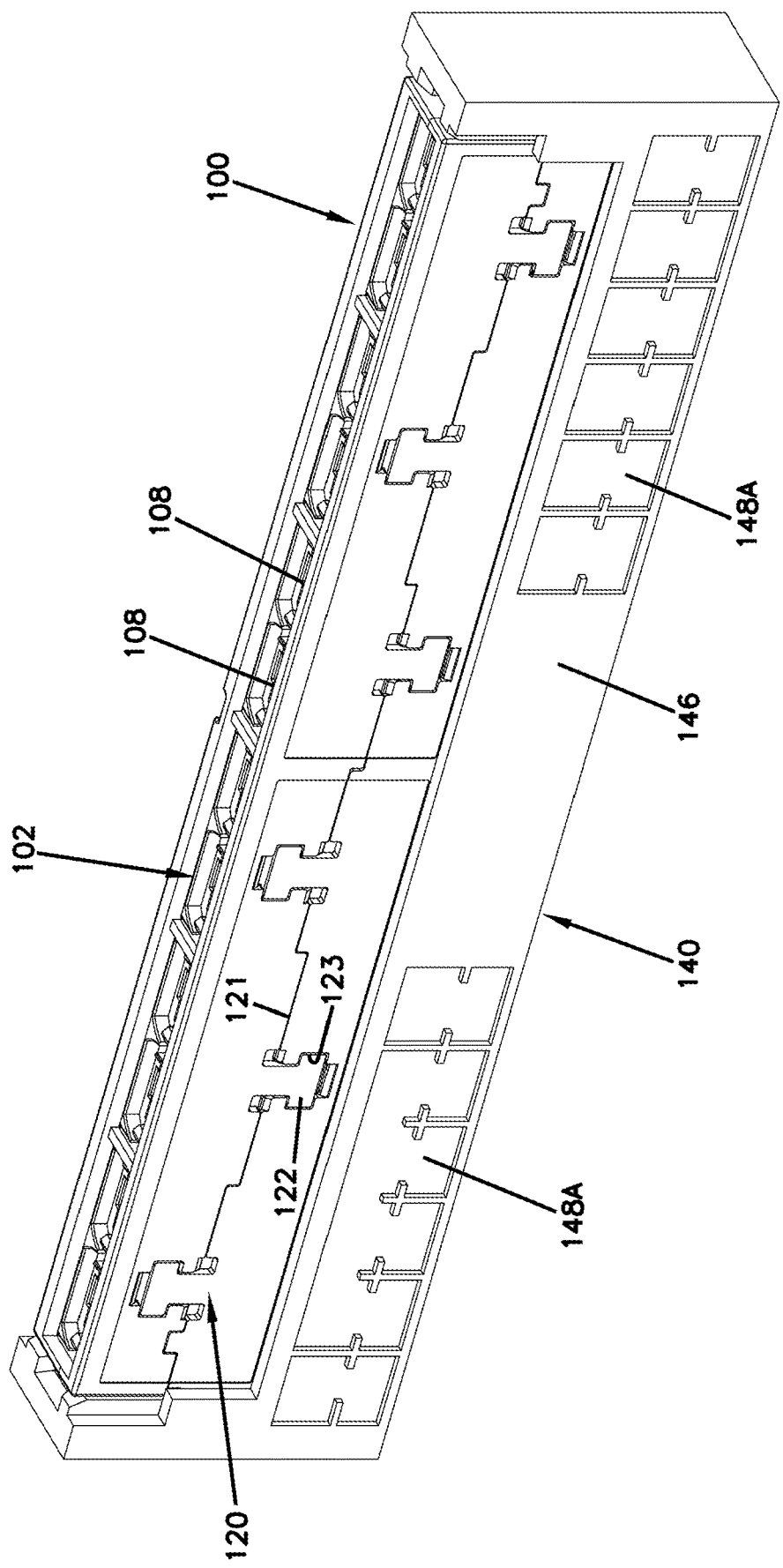

As shown in FIG. 12, the fixture 140 holds the assembled adapter block assembly 100 when the second housing piece 110B is attached to the first housing piece 110A. The indicia 148A, 148B of the fixture 140 identify a rotational orientation of the adapter block assembly 100. For example, the indicia 148A, 148B indicate which non-port side 105, 106 of the adapter block assembly 100 the keyways 135 of the adapter ports 134 face.

Figure 13:
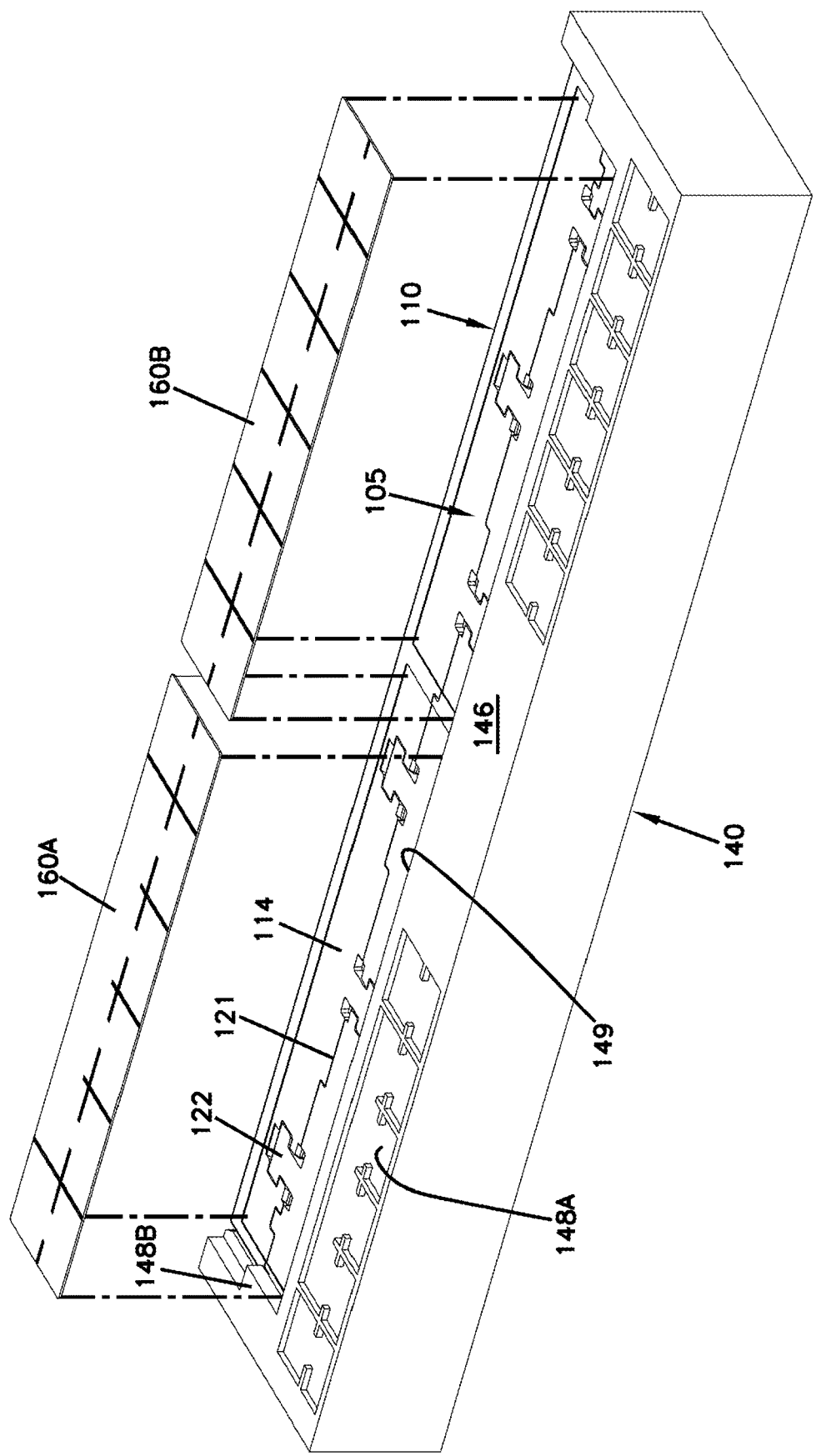
Figure 14:
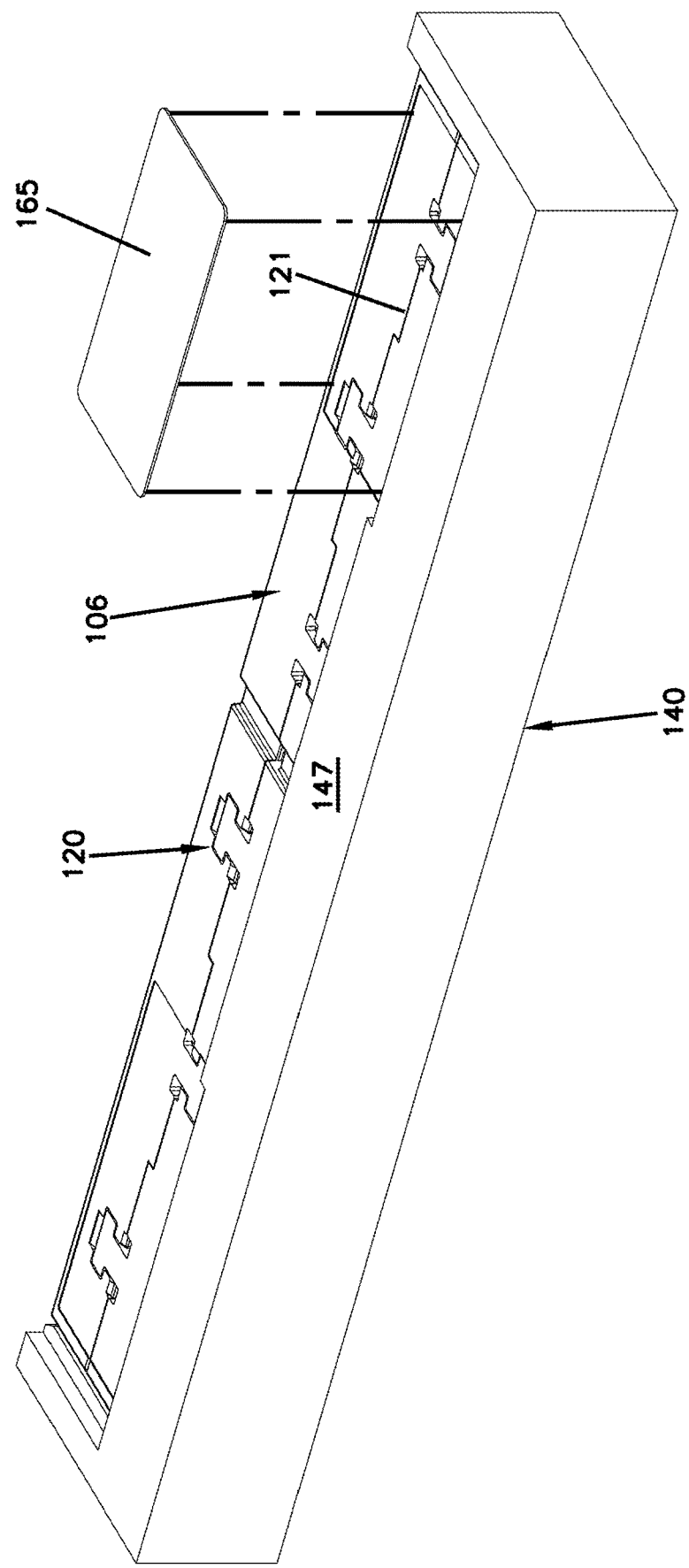

As shown in FIGS. 13 and 14, the fixture 140 can be utilized to attach labels to the adapter block assembly 100. For example, the fixture 140 can be laid on the non-port side that does not include the indicia 148A, 148B. A user can apply one or more port labels 160 to this non-port side 105 of the adapter block assembly 100. In certain implementations, a sidewall 149 of the fixture 140 is sufficiently short to provide access to a majority of the non-port side 105. In an example, the port labels are adhesively fixed to the non-port side 105.

In certain examples, the port labels 160 extend over at least part of the seam 121 between the first and second housing pieces 110A, 110B. In certain examples, the port labels 160 extend over at least part of the retention arrangement 120. In the example shown, the port labels 160 fully cover the latch arms 122 and recesses 123. Accordingly, the port labels 160 can provide anti-tamper functionality (by inhibiting manual separation of the housing pieces or showing damage to alert a user to tampering by others).

As shown in FIG. 14, the fixture 140 can be flipped over 180° so that the indicia 148A, 148B face the surface on which the fixture 140 is seated. A block label 165 can be added to the second non-port side 106 of the adapter block assembly 100. In certain examples, the block label 165 extends over at least part of the seam 121 between the first and second housing pieces 110A, 110B. In certain examples, the block label 165 extends over at least part of the retention arrangement 120. In the example shown, the block label 165 fully covers two of the latch arms 122 and recesses 123 of the retention arrangement 120.

Figure 15:
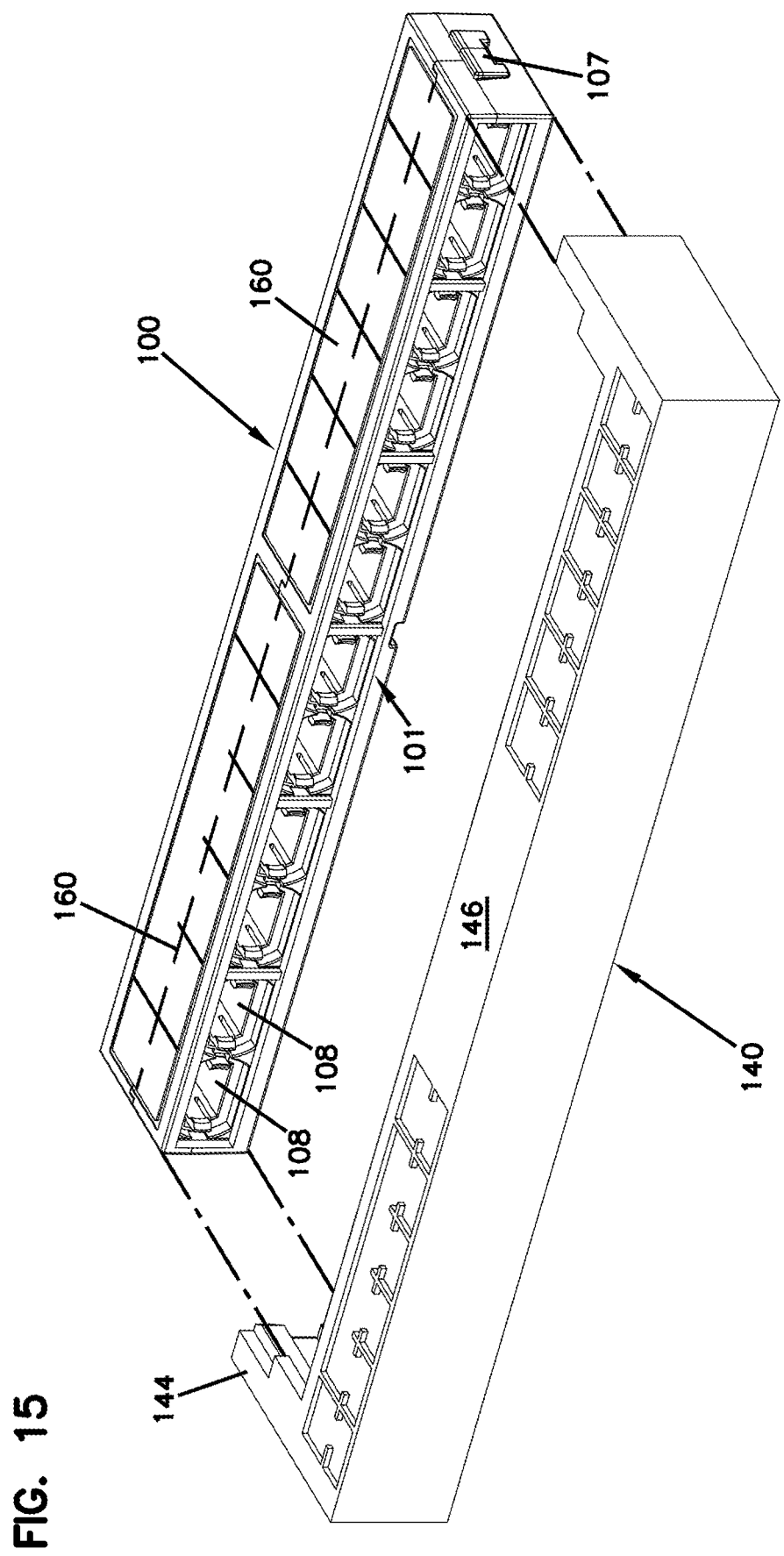

As shown in FIG. 15, the adapter block assembly 100 can be removed from the fixture 140. In certain examples, the adapter block assembly 100 is removed by sliding the adapter block assembly 100 away from the base 141 so that the securement arrangements 107 slide along the guide channels 145 and through the open tops of the guide channels 145.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A method of assembling an adapter block assembly, the method comprising:
    mounting a first housing piece onto a fixture, the first housing piece having a first port side facing a base of the fixture, the fixture including an alignment member that extends upwardly through an aperture defined in the first port side of the first housing piece;
    mounting an adapter to the fixture over the first housing piece, the adapter defining a port, the adapter being mounted so that the alignment member extends into the port;
    mounting a second housing piece over the adapter so that the adapter is disposed within a cavity defined by the first and second housing pieces; and
    securing the second housing piece to the first housing piece to form an adapter block assembly.

2. The method of claim 1, wherein the alignment member includes a key that fits with a keyway defined at the port to rotationally orient the adapter relative to the fixture.

3. The method of claim 1, further comprising applying a label to a first non-port side of the adapter block assembly without removing the adapter block assembly from the fixture.

4. The method of claim 3, further comprising rotating the fixture and the adapter block assembly to lay an opposite second non-port side on a surface prior to applying the label to the first non-port side, wherein the fixture is rotated based on indicia identifying the first non-port side.

5. The method of claim 4, further comprising:
rotating the fixture and the adapter block assembly to lay the first non-port side on the surface; and
applying a second label to the second non-port side.

6. A fixture for use in assembling an adapter block assembly that includes an optical adapter defining oppositely facing ports aligned along a plug insertion axis, the fixture comprising:
a body including a base that is elongated along a length between a first end and a second end;
a plurality of alignment members disposed in a row along the base and extending upwardly from the base, each alignment member being oriented and sized to fit within the port of the optical adapter in a direction along the plug insertion axis;
a first alignment guide extending upwardly from the base at the first end of the body, the first alignment guide extending farther upwardly from the base than the alignment members; and
a second alignment guide extending upwardly from the base at the second end of the body so that the row of alignment members extends between the first and second alignment guides, the second alignment guide extending farther upwardly from the base than the alignment members.

7. The fixture of claim 6, wherein each alignment member includes a key member sized and shaped to fit within a keyway defined by a respective port of an adapter.

8. The fixture of claim 6, further comprising the adapter block assembly mounted thereto, wherein the adapter block assembly comprises a first housing piece mounted to the fixture, an adapter mounted to the fixture over the first housing piece, and a second housing piece mounted over the adapter so that the adapter is disposed within a cavity defined by the first and second housing pieces, wherein the second housing piece is secured to the first housing piece.

9. The fixture of claim 6, further comprising a first housing piece mounted thereto.

10. The fixture of claim 9, further comprising an adapter mounted over the first housing piece so that one of the alignment members extends into a port defined by the adapter.

11. The fixture of claim 8, wherein sides of the fixture extend between the first and second ends and are sufficiently low to the base to enable labels to be added to the adapter block assembly without removing the adapter block assembly from the fixture.

12. The fixture of claim 8, wherein the fixture includes indicia that indicate a rotational orientation of the adapter block assembly.

13. An adapter block assembly comprising:
a plurality of optical adapters, each adapter defining oppositely facing ports aligned along a plug insertion axis, each adapter including opposing major surfaces extending along a length of the adapter between opposite end surfaces, wherein the oppositely facing ports extend between the opposite major surfaces and between the opposite end surfaces, wherein each adapter defines a protrusion extending outwardly along a width of the adapter on each of the opposite end surfaces of the adapter;
first and second housing pieces that cooperate to define an interior in which the optical adapters are disposed in a row so that the adapters are aligned along the lengths of the adapters with the oppositely facing ports of each adapter being provided in a stacked configuration along the row, each of the first and second housing pieces including dividing walls, wherein notched portions of the dividing walls of the first and second housing pieces cooperate with each other when the first and second housing pieces are brought together to define a major notch that captures the protrusion extending outwardly from each of the opposite end surfaces of each adapter to sandwich the protrusions to hold the optical adapters in position so that the adapters are prevented from moving along a direction aligned with the plug insertion axis.

14. The adapter block assembly of claim 13, wherein the optical adapters include multi-fiber optical adapters.

15. The adapter block assembly of claim 13, wherein the first and second housing pieces are identical to each other.

16. The adapter block assembly of claim 13, wherein the first and second housing pieces cooperate to define oppositely facing securement parts by which the adapter block assembly is configured to be mounted to equipment.

17. The adapter block assembly of claim 13, wherein each of the first and second housing pieces includes a plurality of latch arms and a plurality of recesses sized and shaped to receive the latch arms of the other housing piece.

18. A method of assembling an adapter block assembly, the method comprising:
mounting a first housing piece onto a fixture, the first housing piece having a first port side facing a base of the fixture, the fixture including an alignment member that extends upwardly through an aperture defined in the first port side of the first housing piece; and
mounting an adapter to the fixture over the first housing piece, the adapter defining a port, the adapter being mounted so that the alignment member extends into the port, wherein the alignment member includes a key that fits with a keyway defined at the port to rotationally orient the adapter relative to the fixture.

* * * * *